Jan. 25, 1938.   R. M. SMITH   2,106,685
REFRIGERATING APPARATUS
Filed Feb. 29, 1936   2 Sheets-Sheet 1

INVENTOR.
Rolf M Smith
BY
Spencer Hardman and Fehr
ATTORNEYS

Jan. 25, 1938.  R. M. SMITH  2,106,685

REFRIGERATING APPARATUS

Filed Feb. 29, 1936   2 Sheets—Sheet 2

INVENTOR.
Rolf M. Smith
BY
Spencer Hardman and Fehr
ATTORNEYS

Patented Jan. 25, 1938

2,106,685

UNITED STATES PATENT OFFICE 2,106,685

REFRIGERATING APPARATUS

Rolf M. Smith, Dayton, Ohio, assignor to General Motors Corporation, Dayton, Ohio, a corporation of Delaware Application February 29, 1936, Serial No. 66,461

12 Claims. (Cl. 230—2)

This invention relates to refrigerating apparatus and more particularly to control means therefor.

Recently, rotary compressors have been used in domestic refrigerating apparatus in increasing numbers. These compressors have largely been driven by split phase alternating current motors which have a relatively low starting torque. It is, therefore, necessary to provide some protection for such motors to prevent excessive starting loads thereon. One simple method of unloading the compressor during the starting of the motor is to operate the compressor in the reverse direction to sweep compressed refrigerant from the compressing chamber and then to rotate the motor and compressor in the forward direction. This method is applicable to a number of types of compressors, particularly rotary compressors provided with flapper or check discharge valves. While such a method may be easily practised manually, it is difficult to provide a satisfactory control which will operate automatically to reverse the motor for only a very few turns and thence to operate the motor in the forward direction during the remainder of each operating period.

It is an object of my invention to provide an automatic control means for a motor pump unit which will rotate the motor-compressor unit in a reverse direction for a relatively few number of turns to unload the pump and thence to operate the motor pump unit in the forward direction during the remainder of each operating period.

It is a further object of my invention to provide a single phase induction motor with a control means for first energizing the phase winding in the reverse direction, thence in the normal direction and thereafter deenergizing the phase winding independently of the main winding, all by a single electromagnetic operating means.

It is another object of my invention to provide a reversible single phase induction motor with a separate exciting or current generating controlled means for terminating the reverse energization of the phase winding and starting the normal energization of the phase winding.

It is another object of my invention to operate a reversing means for an electric motor by means which increases in power with the speed of the motor.

Further objects and advantages of the present invention will be apparent from the following description, reference being had to the accompanying drawings, wherein a preferred form of the present invention is clearly shown.

Briefly, I have disclosed a refrigerating system including a sealed unit containing an eccentric type of rotary compressor provided with a check valve on its discharge side and driven by a split phase type of induction motor directly connected to the compressor. The compressor circulates refrigerant through a refrigerating system. This compressor may be unloaded by rotating the compressor in the reverse direction for a minimum of something between one and two revolutions depending upon the position of the eccentric at the time the compressor is started in the reverse direction. However, two or three turns in the reverse direction are ordinarily sufficient to insure unloading of such a compressor.

In order to accomplish this unloading, a reversing switch is provided for controlling the supply of energy to the phase winding of the motor, which reversing switch is biased to direct the flow of electric energy in the reversed direction through the phase winding. A solenoid energized by a separate exciting winding wound in the stator of the motor is provided for operating this reversing switch to energize the phase winding in the normal direction after several reverse turns of the motor and compressor. This solenoid also acts to open the phase winding circuit after the motor has reached a sufficient speed. A bimetal overloading device and a thermostatic temperature responsive switch means are provided in the motor circuit for controlling the energization of the motor.

Figure 1:
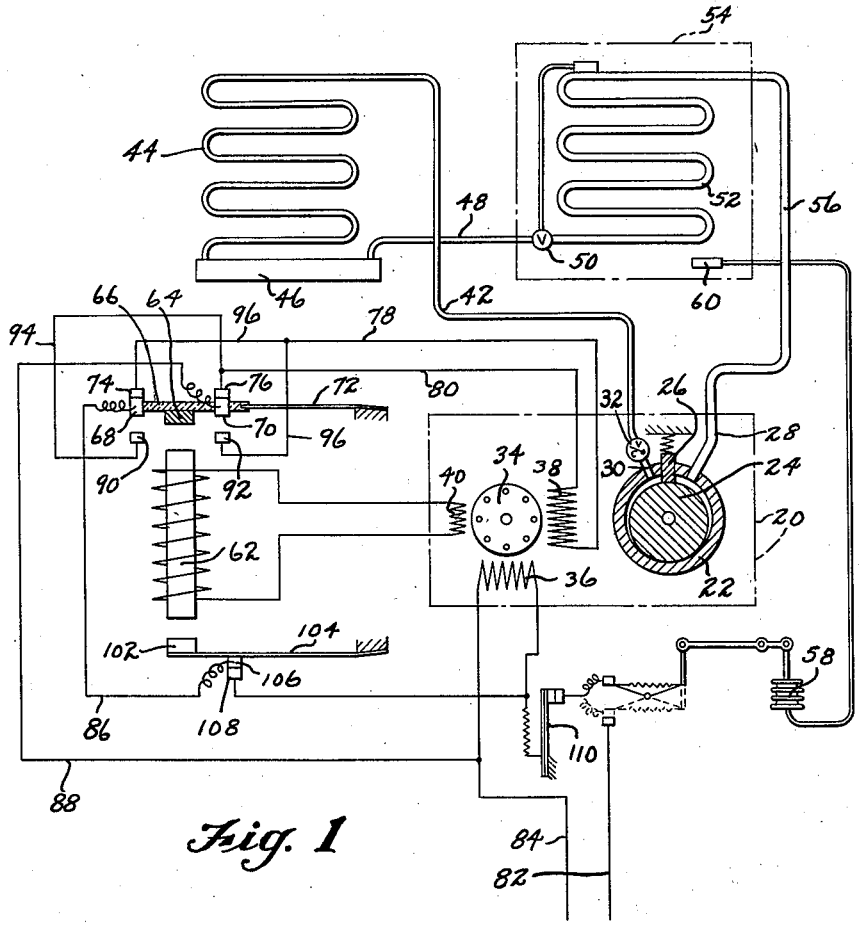
Fig. 1 is a diagrammatic illustration of a refrigerating system embodying my invention.

Referring now to the drawings, and more particularly to Fig. 1, there is shown a refrigerating system including a sealed unit 20 containing a rotary compressor 22 of the eccentric type having a rotatable eccentric 24, a divider block 26, an inlet 28, an outlet 30 and a check valve 32 for controlling the discharge of compressed refrigerant from the compressor. This compressor 22 is directly connected to the rotor 34 of a split phase induction motor having in its stator a main or running winding 36, a starting or phase winding 38 and a separate exciting coil or winding 40 which is wound upon the stator of the rotor along with the main and running windings.

The compressor discharges compressed refrigerant through the check valve 32 at the outlet of the compressor from which it is conducted through a supply conduit 42 to a condenser 44 where the compressed refrigerant is condensed and collected in a receiver 46. From the receiver 46, the liquid refrigerant is forwarded through a supply conduit 48 under the control of an expansion valve 50 of the automatic thermostatic type which controls the flow of liquid refrigerant to the evaporating means 52 according to the pressure of the refrigerant within the evaporating means 52 and according to the temperature of the refrigerant leaving the evaporating means 52. The evaporating means absorbs heat from and cools a medium contained within the enclosure 54 by the evaporation of liquid refrigerant under reduced pressure and this evaporated refrigerant is returned to the inlet 28 of the compressor through the return conduit 56.

The operation of the compressor is controlled by a snap acting switch means 58 located in the supply line of the electric motor and operated according to the temperature of a thermostatic bulb 60 located within the enclosure 54 containing the medium to be cooled. If the motor should start in the forward direction after an idle period, considerable torque would be required to operate the compressor because the pressure upon the outlet side of the compressor is considerably greater than the pressure at the inlet of the compressor in addition to the friction load of the compressor. However, if the compressor is rotated in the reverse direction for two or three revolutions, the greater part of the gas within the pumping chamber of the compressor will be swept or pumped back into the suction or return conduit 56 and whatever gas there is within the pump chamber of the compressor will be at a relatively low pressure which will probably be a pressure in the neighborhood of the pressure in the suction or return conduit 56. Thus, such a reversing operation prepares the motor for an easy start in the forward direction since more than one turn of the compressor can ordinarily be made after reverse operation with but little gas compressed, and this is sufficient to provide the motor with a sufficient start to enable it to carry the pumping or compressing load thereafter imposed upon it for the remainder of the operating period.

It has been found somewhat difficult to provide a practical form of control means for providing automatic operation of the motor-compressor unit in this manner. Several operative devices have been controlled by bimetallic means heated by motor currents. I find that bimetallic control means ordinarily provide a reversing operation which is longer than necessary and thus delay the effective operation of the compressor.

In order to provide a quicker operating control device, I have provided a single electromagnet for reversing the energization of the electric motor several revolutions after the motor has started in the reverse direction. Thereafter this electromagnetic means holds the reversing device in the proper position for forward operation. I also employ this electromagnetic means for deenergizing the starting winding. This electromagnet is energized by the separate exciting coil 40. The separate exciting coil has created therein a relatively small amount of excitation by the main and starting windings 36 and 38, while the rotor 34 is idle. This is believed to be provided by a transformer effect in the stator of the motor. However, when the rotor begins to rotate, this separate exciting winding has additional voltage generated or excited therein which increases in substantially direct proportion to the speed of the rotor. This separate exciting winding 40 is connected to an electromagnet 62 which, of course, creates a magnetic effect which is proportional to the excitation of the exciting winding 40.

In the figure, above the electromagnet 62, is a reversing switch provided with an armature 64 capable of being attracted by the electromagnet. This armature is fastened to an insulating member 66 which is provided with switch contacts 68 and 70 which are insulated from each other. This insulating member 66 is mounted upon the free end of a leaf spring 72 which is anchored at the opposite end and in such a way that it is biased in the upward direction by its own resiliency so that the contacts 68 and 70 are thus held resiliently in contact with the upper cooperating contacts 74 and 76. These upper contacts 74 and 76 are connected by electrical conductors 78 and 80 to the starting or phase winding 38 of the electric motor. This starting or phase winding 38 is supplied with electric energy from the supply conductors 82 and 84 through the conductors 86 and 88 which connect to the contacts 68, 70 and 74, 76 to supply electric energy to the phase winding 38 in the direction which causes the motor to operate in a reverse direction at an increasing speed.

However, within several turns of the motor in the reverse direction, the exciting winding becomes excited sufficiently to cause the electromagnet 62 to attract the armature 64 to draw the contacts 68 and 70 into contact with a second set of contacts 90 and 92, which, through the conductors 94 and 96, reverses the energization of the starting or phase winding 38. This reverse energizing of energy stops the rotor 34 and then tends to cause it to rotate in the forward direction. The amount of excitation generated by the transformer effect in the motor windings, even when the rotor is stopped at the point of reversal of operation, is sufficient to enable the electromagnet 62 to hold the armature 64 in its downward position against the relatively light tension of the leaf spring 72 which supports the movable contacts. However, the amount of excitation when the rotor is stopped is insufficient to pull the movable contacts from their upper position to their lower position. It is only sufficient to retain the movable contacts in their lower position after they have moved to such a position. If the exciting current provided by the exciting coil 40 should be insufficient at the time of reversal of operation, an additional winding of rather few turns may be added to the electromagnet 62 connected in either series or parallel with the main winding 36 to provide sufficient attractive force at this time of reversal.

It is normally desirable to deenergize the starting winding after the motor reaches approximately full speed. This deenergization may readily be accomplished by the use of the exciting winding 40 and the electromagnet 62 since such a circuit has admirable characteristics for performing this function. I, therefore, provide a second armature 102 beneath the electromagnet 62 and mounted upon the free end of a relatively heavy leaf spring 104 which is anchored at its opposite end to an adjustable anchor which imposes sufficient tension upon the leaf spring to prevent the armature 102 from being attracted until the excitation of the electromagnet 62 approaches the amount exerted at full speed. This leaf spring 104 is provided with a contact 106 which cooperates with a stationary contact 108 located in series with the electric conductor 86 which feeds the starting or phase winding. Thus, this conductor 86 is not deenergized until a considerable period after the motor has reversed its direction of operation and has operated in the forward direction for a sufficient period of time to enable it to reach a speed where it may operate without the benefit of the starting winding.

Both the starting and running winding are protected against overloads or excessive current flow by a bimetal thermal overload device 110 which is located in series with the snap acting thermostatic switch 58 in the supply conductor 82.

Figure 2:
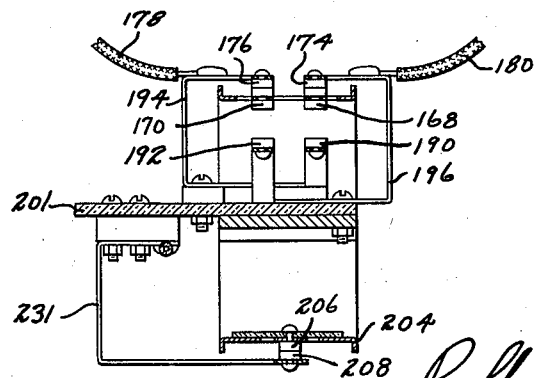
Fig. 2 is a section taken along the lines 2—2 of Fig. 4.
Figure 3:
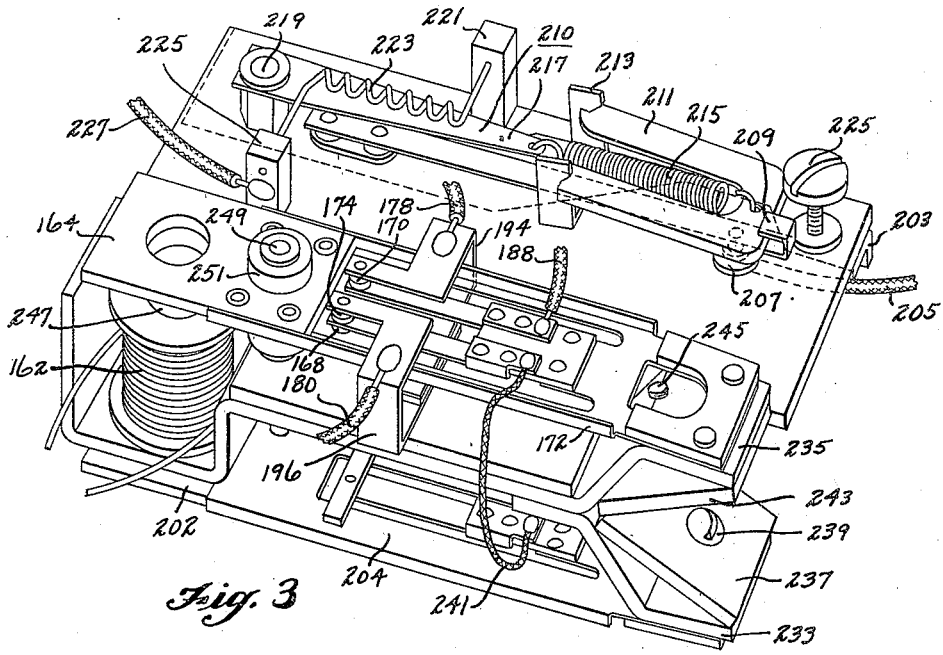
Fig. 3 is a perspective view of a practical form of control device shown diagrammatically in Fig. 1.
Figure 4:
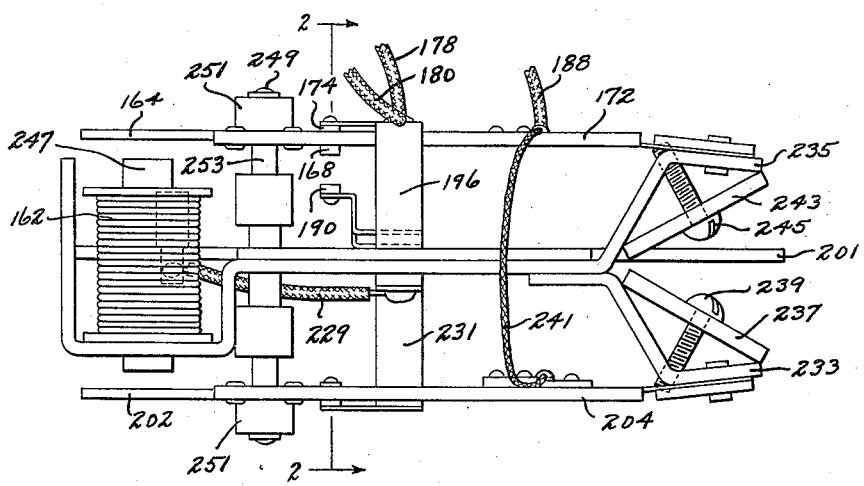
Fig. 4 is a view in elevation looking at the front of the control device shown in Fig. 3.

In Figs. 2 to 4 a practical form is shown of the diagrammatically illustrated motor control means. In this practical form, there is provided a base 201 of sheet insulating material to which is fastened at one edge a flanged copper or brass plate 203 over which is mounted the thermal overload mechanism generally designated by the reference character 210 which corresponds to the thermal overload mechanism 110. In this thermal overload mechanism, there is an electrical conductor 205 which connects to the line conductor through the thermostatically controlled switch 58. This conductor 205 connects to a contact 207 which is mounted upon the insulating base 201 spaced from the copper plate 203.

This contact 207 cooperates with a contact provided upon the bottom of a copper strip 209 provided with a hooked end which is engaged by a U-shaped toggle lever 211 pivotally mounted upon knife edges provided in an adjustable U-shaped circuit 213. The upward movement of this U-shaped toggle lever is limited by the large flat headed screw 255 threaded into the base 201. This toggle lever 211 is connected by a tension toggle spring 215 to a tapered bimetal member 217 which is riveted to a post 219 fastened to the insulating base 201 and the copper plate 203. The copper strip 209 is also riveted to the insulating base and the copper plate 203. A square post 221 is mounted upon and riveted to the copper plate 203. A curled heater wire 223 has one end connected to this square post 221 with its curled portion supported directly over the bimetal member 217 while its opposite end is connected to a second square post 225 which is fastened to the insulating base 201.

This second square post 225 is connected by a conductor 227 to one end of the running winding and is likewise connected by a conductor 229 to a conductor member 231 formed of thin strip brass or other suitable metal which is fastened at one end to the insulating base 201 while its opposite end supports a contact 208 (which corresponds to the contact 108 of Fig. 1). This contact 208 cooperates with a cooperating contact 206 (which corresponds to the contact 106 of Fig. 1) fastened by riveting to a spring contact member 204 (corresponding to the spring member 104) which is provided at its free end with an armature 202. This spring member at the end opposite the armature 202 is riveted to a heavy sheet metal structural member 233 which is spot welded to a second structural member 235.

An adjustment means is provided by which the free end portion of this structural member 233 may be sprung in order to change the angle of the anchoring of the end of the spring member 204. This is done by providing a plate member 237 provided with a screw 239 which is threaded into the member 233 so as to exert a bending stress upon the member 233 sufficient to change its angularity slightly. By tightening or loosening the screw 239, the tension of the spring member 204 is decreased or increased to lower or raise the motor speed at which the contacts 206 and 208 are opened to open the starting winding circuit.

An electrical conductor 241 extends from the spring member 204 to a second spring member 172 which is anchored to the free end of the structural member 235. This free end of the structural member 235 is also provided with an adjustment which includes the plate 243 provided with a screw 245 which is threaded into the free end of the structural member 235 in order to exert a bending stress thereon. This bending stress will change the angularity of the anchoring portion of the spring member 172 so that when the screw is tightened, the tension of the spring member 172 will be reduced, while when the screw is loosened the tension upon the spring member 172 will be increased. The spring member 172 is provided at its opposite end with an armature 164 which corresponds to the armature 64 of Fig. 1.

This armature 164, as well as the armature 202, is attracted by an electromagnet 162 which is provided with a threaded soft iron core 247 provided with screw slots at each end so that the soft iron core may be raised or lowered with respect to the armatures 164 and 202 merely by the use of a screw driver to turn the soft iron core which is threaded into the body of the electromagnet. This electromagnet 162 is mounted within a U-shaped portion of the structural member 235 which preferably is made of a soft steel so that this portion of this member may act to carry the flux of the electromagnet and thereby increase its efficiency.

The spring member 172 is also provided with an insulating member which carries a pair of separately mounted spring tongues, each of which has a pair of movable contacts 168 and 170 (see Fig. 2) which corresponds to the contacts 68 and 70 of Fig. 1. On one side of the contacts, there is provided a stationary strip conductor member 196 (corresponding to the conductor 96 of Fig. 1) which is provided at its upper extremity with a contact 174 corresponding to the contact 74 of Fig. 1 which cooperates with the contact 168, while at the other end of this member 196, there is provided a second contact 192 (corresponding to the contact 92 of Fig. 1) which cooperates with the movable contact 170. This member 196 is connected by an electrical conductor 180 which corresponds to the conductor 80 of Fig. 1, to one end of the phase winding of the motor.

A second conducting strip member 194 connected to an electrical conductor 178 (corresponding to the conductors 78 of Fig. 1) is connected to the opposite end of the phase winding of the electric motor. This conducting strip member 194 is provided with an upper contact 176 (corresponding to the contact 76 of Fig. 1) which cooperates with the movable contact 170 and a lower contact 190 (corresponding to the contact 90 of Fig. 1) which cooperates with the movable contact 168. The armatures 164 and 202 are provided with a silencing means in the form of a vertical rod 249 fastened to the insulating base 201 and the structural member 235. This rod is provided with round felt members 251 which are threaded thereon and held between spacers 253. These felt members are placed on opposite sides of each of the armatures so as to reduce the shock and to render them more quiet. These also serve as stop members to limit the movement of the armatures.

In operation, the lower spring member 204 is anchored so that its free end is urged downwardly against the lower felt member 251 with the contacts 206 and 208 in engagement with each other. Likewise, the spring member 152 has its anchoring support at such an angle that its free end is held against the uppermost felt member but with not nearly so much force as is the lower spring member 204 against its stop. In fact, the free end of this spring member 152 should very nearly float.

When the free end of the spring member 172 is against its stop, the movable contacts provided thereon are against the upper contacts 174 and 176 (see Fig. 2) so that when the thermostat switch closes to energize the motor, the current flows from the conductor 205 through the contact 207 to the copper strip 209 and from the copper strip to the copper plate 203 and thence from the copper plate 203 to the post 221, thence through the electric heater 223 to the second post 225. From the second post 225 some of the current flows to the running winding through the conductor 227, while other current flows through the conductor 229 to the strip conducting member 231, thence through the contact 208 and 206 to the spring member 204. From the spring member 204 the current is conducted through the conductor 241 to the tongue which carries the contact 168. During this starting period the contact 168 is in engagement with the contact 174 so that current flows therefrom to the conductor 180. After passing through the phase winding the current then flows through the conductor 178 to the contact 176, thence to the contact 170 and its spring tongue to a conductor 188 (corresponding to the conductor 88) which connects to the line.

At this time a small amount of current is excited in the exciting winding or motor and this is transmitted to the electromagnet 162. At the beginning this is insufficient to attract the armature 164 because the armature 164 is in its uppermost position spaced away from the electromagnet. However, because the armature 164 is in its uppermost position in which the electric energy flows through the phase winding in the reverse direction, the motor begins to turn in the reverse direction. With the turning of the motor in the reverse direction at an increasing speed, the excitation upon the exciting winding increases, thereby causing an increase in voltage and current flow so that after several turns of the motor at increasing speed, the electromagnet 162 has sufficient attractive power to attract the armature 164 and to move it to and hold it in its lowermost position in which the movable contacts 168 and 170 make engagement with the lower contacts 190 and 192 to reverse the flow of current through the phase winding of the motor so as to cause the motor to tend to rotate in the forward direction. This stops the reverse rotation of the motor and then starts the motor in the forward direction.

During this time the current in the exciting winding and the electromagnet 162 will fall, but a sufficient amount of current will flow to provide a sufficient attractive force to retain the armature 164. The force required to retain the armature 164 is, of course, greatly less than the force required to retain it from its uppermost position because the air gap is greatly reduced when the armature is in its lower position.

However, a greater force is required to attract the lower armature 202 because of the greater tension placed upon its spring member and because of the pull of gravity thereon. The pull of gravity favors the attraction of the upper armature 164 but counteracts the attraction of the armature 202. Thus, a considerably greater attractive force is required to attract the armature 202. Therefore, this armature will not be attracted until a considerable speed is attained of the motor approaching full speed. In this way, contacts 206 and 208, although operated by the same electromagnet, are not opened to deenergize the phase winding until a considerable time after the reversing switch controlled by the upper spring member is operated. Thus, a single exciting coil and a single electromagnet are sufficient to operate both the reversing switch and the starting winding switch.

While the form of embodiment of the present invention as herein described, constitutes a preferred form, it is to be understood that other forms might be adopted, all coming within the scope of the claims which follow.

What is claimed is as follows:

1. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, and a speed responsive control means responsive to the speed of the motor for setting the unit to first start the motor in a reverse direction to unload the pump and then setting the unit to operate the motor in the forward direction during the remainder of each operating period.

2. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, and an electrical generating means for setting the unit to first start the motor in a reverse direction to unload the pump and then setting the unit to operate the motor in the forward direction during the remainder of each operating period.

3. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with an exciting winding for setting the unit to first start the motor in a reverse direction to unload the pump and then setting the unit to operate the motor in the forward direction during the remainder of each operating period.

4. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings, means for conducting energy to said windings, a control means including a solenoid operated control device for controlling the conduction of energy to one of the windings to first cause the motor to rotate in the reverse direction and then to alter the energization of the one winding to cause the motor to operate in the forward direction.

5. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings, means for conducting energy to said windings, a control means including a solenoid operated control device for controlling the conduction of energy to one of the windings to first cause the motor to rotate in the reverse direction and then to alter the energization of the one winding to cause the motor to operate in the forward direction and then to deenergize the phase winding independently of the main winding.

6. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings and an exciting coil, means for conducting energy to said windings, means energized by said exciting coil for controlling the conduction of energy to one of the windings to first cause the motor to rotate in the reverse direction and then to control the conduction of energy to said one winding to cause the motor to operate in the forward direction.

7. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings, a reversing switch connected to said phase winding for controlling the supply of energy thereto, said reversing switch being biased to one position, and electromagnetic means operable after a plurality of revolutions of said motor for moving said reversing switch to a second position to reverse the energization of said phase winding.

8. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings, a reversing switch connected to said phase winding for controlling the supply of energy thereto, said reversing switch being biased to one position, and electromagnetic means operable after a plurality of revolutions of said motor for moving said reversing switch to a second position to reverse the energization of said phase winding, and means for deenergizing said phase winding following the reversing of said reversing switch.

9. A motor pump unit including a motor and a pump driven by said motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the pumping chamber through the inlet when the motor operates in a reverse direction, said motor being provided with electrical phase and main windings, a reversing switch connected to said phase winding for controlling the supply of energy thereto, said reversing switch being biased to one position, electromagnetic means operable after a plurality of revolutions of said motor for moving said reversing switch to a second position to reverse energization of said phase winding, and means operated by said electromagnetic means following the reversing of said reversing switch for deenergizing the phase winding.

10. An electric motor pump unit including an electric motor and a pump driven by said electric motor, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the electric motor operates in a forward direction and to sweep fluid from the pumping chamber through the inlet when the electric motor operates in a reverse direction, means for conducting electric energy to said electric motor, and electromagnetic means for controlling the supply of energy to said motor to cause the motor to first start in a reversed direction to unload the pump and then to alter the supply of energy to cause the motor to reverse its direction of operation and operate in a forward direction during the remainder of each operating period.

11. A motor pump unit including a motor and a pump driven by said motor, said motor having windings capable of operating the motor in either direction, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in a forward direction and to sweep fluid from the chamber through the inlet when the motor operates in a reverse direction, and speed responsive control means responsive to the speed of the motor for energizing the motor windings to first start the motor in a reverse direction to unload the pump and then energizing the winding to operate the motor in a forward direction during the remainder of each operating period.

12. A motor pump unit including a motor and a pump driven by said motor, said motor having windings capable of being energized to operate the motor in either the reverse or forward direction, said pump having a pumping chamber provided with a check valve at its outlet for preventing the flow of discharged fluid back into the pumping chamber, said pumping chamber being provided with a piston capable of forcing fluid from the pumping chamber through the check valve at its outlet when the motor operates in the forward direction and to sweep fluid from the pumping chamber through the inlet when the motor operates in a reverse direction, and an electrical generating means operated by the unit for energizing the windings of the motor to first start the motor in a reverse direction to unload the pump and then changing the energization of the winding to the motor to cause the motor to operate in a forward direction during the remainder of each operating period.

ROLF M. SMITH.